United States Patent [19]

Le Salver et al.

[11] 4,154,206

[45] May 15, 1979

[54] SUSPENSION DEVICE FOR A ROTATING MACHINE LACKING BALANCE

[75] Inventors: Robert Le Salver, Chanteloup-les-Vignes; Dominique Poupard, Versailles, both of France

[73] Assignee: Automobiles Peugeot, Paris, France

[21] Appl. No.: 826,679

[22] Filed: Aug. 22, 1977

[30] Foreign Application Priority Data

Sep. 9, 1976 [FR] France ............................ 76 27145

[51] Int. Cl.² .................... F02B 75/06; F16F 15/12
[52] U.S. Cl. .......................... 123/192 R; 123/192 B; 267/35; 180/64 R; 248/613; 248/638; 248/675
[58] Field of Search ................ 123/192 B, 192 R; 267/35; 180/64 R; 248/3, 6, 7, 8, 9, 20, 22, 358 R

[56] References Cited

U.S. PATENT DOCUMENTS

| 1,723,430 | 8/1929 | Lee ..................................... 123/192 R |
| 1,738,532 | 12/1929 | Harbour ............................ 123/192 R |
| 1,929,104 | 10/1933 | Summers ........................... 123/192 R |
| 1,958,148 | 5/1934 | Kjaer ................................ 123/192 R |
| 1,980,541 | 11/1934 | Lee .................................... 123/192 R |
| 2,038,968 | 4/1936 | Summers ................................. 248/7 |
| 2,656,137 | 10/1953 | Leggett et al. .................. 248/358 R |
| 2,705,118 | 3/1955 | Beck ................................ 248/358 R |
| 3,760,694 | 9/1973 | Lieb ................................. 123/192 R |

FOREIGN PATENT DOCUMENTS

| 2012341 | 10/1971 | Fed. Rep. of Germany .............. 248/7 |
| 2533866 | 2/1976 | Fed. Rep. of Germany ...... 248/358 R |
| 273605 | 9/1933 | Italy ................................................ 267/35 |

Primary Examiner—Charles J. Myhre
Assistant Examiner—Jeffrey L. Yates
Attorney, Agent, or Firm—Burns, Doane, Swecker & Mathis

[57] ABSTRACT

The present invention relates to a suspension device for a rotating machine lacking balance, comprising at least one elastic support defining a first chamber filled with liquid, wherein said first chamber is connected to a second chamber, likewise filled with liquid, closed by a flexible wall subjected to alternate displacements of frequency and phase equal to the frequency of the lack of balance to be compensated.

11 Claims, 3 Drawing Figures

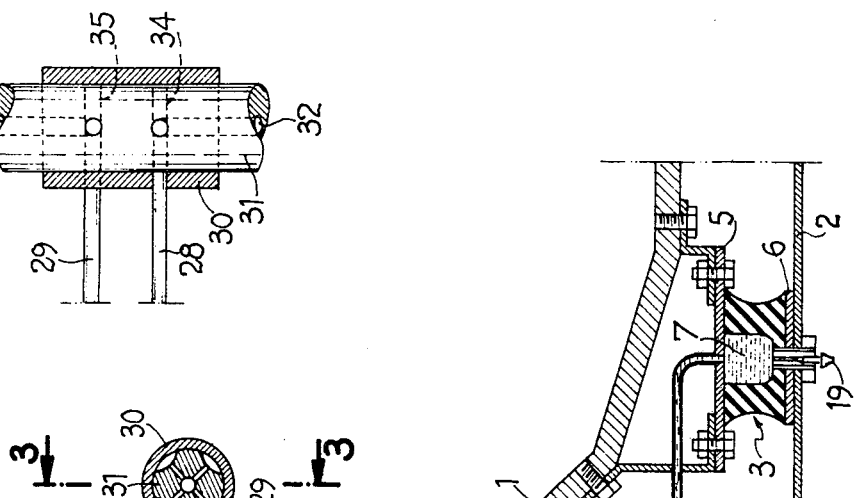
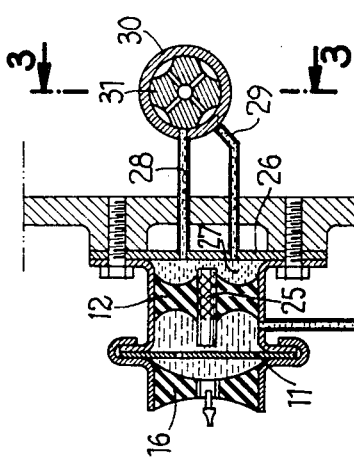
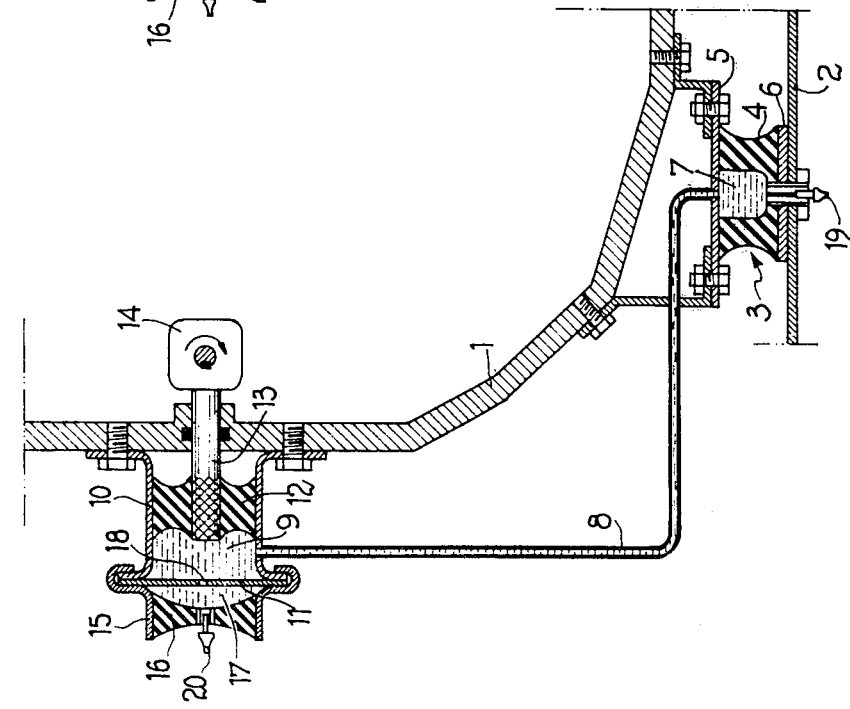

SUSPENSION DEVICE FOR A ROTATING MACHINE LACKING BALANCE

The present invention relates to a suspension device for a rotating machine lacking balance, and is more particularly applied to the suspension of an internal combustion engine in an automobile vehicle.

Any rotating machine having such a lack of balance and suspended elastically to avoid transmission of vibrations, undergoes a displacement of constant amplitude and phase as a function of the frequency, as long as said latter remains greater than twice the natural frequency of the machine on its supports, which, moreover, is always the case if the suspension is well done.

The elastic suspension elements therefore transmit forces proportional to their stiffness.

It is an object of the invention to remedy the above drawback by creating a suspension device in which the forces transmitted by the elastic suspension elements are eliminated.

The invention therefore relates to a suspension device for a rotating machine lacking balance, comprising at least one elastic support defining a first chamber filled with liquid, wherein said first chamber is connected to a second chamber likewise filled with liquid, closed by a flexible wall subjected to alternate displacements of frequency and phase equal to the frequency to be compensated.

Such an arrangement enables the vibration and humming level in the interior of a vehicle fitted with an engine suspended by means of the device according to the invention, to be considerably improved.

Hereinafter are given two applications of the device according to the invention to the suspension of a four-cylinder, line engine, for which the frequency of the parasitic vibrations is double the speed of rotation of the crankshaft.

The invention will be more readily understood on reading the following description with reference to the accompanying drawings, in which:

FIG. 1 shows a section through a first embodiment of the suspension device according to the invention;

FIG. 2 is a view in section of a second embodiment of the device according to the invention, and FIG. 3 is a partial section along line 3—3 of FIG. 2.

Referring now to the drawings, FIG. 1 shows a portion of the housing 1 of a thermal engine which rests on a structural element 2 of the vehicle, via an elastic support 3. This latter is constituted by an elastomeric block 4 which is adherized to two fittings 5 and 6 and defining a first closed chamber 7.

Said first chamber 7 communicates via a conduit 8 with a second chamber 9 defined by a casing 10, a rigid wall 11 and an elastic wall 12 which is adherized to a central push rod 13. The casing 10 is fixed to the housing 1 through which push rod 13 passes.

This latter abuts on a cam 14 rotated so as to supply two impulses to the push rod 13 per revolution of the crankshaft of the engine. This cam 14 may therefore comprise, in practice, four lobes and may be fast with the cam shaft of the engine if said latter operates in a four-stroke cycle.

The casing 10 and the wall 11 are connected together by a fitting 15 which delimits with an elastic wall 16 and the wall 11 a third chamber 17 communicating with the second chamber 9 through a calibrated aperture 18 made in the wall 11.

The first chamber 7, conduit 8, second chamber 9 and third chamber 17 are completely filled with a liquid, by means of a filling device 19 and a drain device 20.

It is seen that, in the device which has just been described, the cam 14 transmits alternative movements to the push rod 13. These movements vary the volume of the second chamber 9 which, due to the virtual incompressibility of the liquid, brings about displacements of the fitting 5 of the support 3 with respect to the fitting 6.

The amplitude of the displacement of the push rod 13 is calculated so as to obtain a displacement of the fitting 5, in the direction of compression of the support 3, equal to the displacement of the engine at right angles to the support, in the same direction, the two movements being in phase.

Due to the compensation of the displacements of the engine by the deformations of the support 3, by the hydraulic pressure prevailing in the first chamber 7, any strain on the structural element 2 is avoided.

The purpose of third chamber 17 is to limit the variations in pressure in the circuit under the effect of the forces undergone by the support to bear the engine and the forces resulting from the vibrations coming from the road.

Upon application of the weight of the engine on the support 3, the elastic deformation of the wall 16 limits the rise in pressure of the liquid in the circuit, this enabling the cam 14 and the push rod 13 to be given reduced dimensions and to reduce wear thereof.

Similarly, the wall 16 is elastically deformed under the effect of the forces originating from the road. To this end, the aperture 18 is so calibrated as to allow free passage of low frequencies, lower than 15 Hz resulting from the vibrations from the road, and to be virtually non-transmissive when the circuit receives from the push rod 13 vibrations of a frequency of 30 H2–200 Hz, (this corresponding to an operating range of the engine of 900–6000 r.p.m.).

It will be noted that the position of the third chamber 17 is not imperative and that it may communicate via the aperture 18 with any point of the circuit constituted by the first chamber 7, conduit 8 and second chamber 9.

In the alternative embodiment shown in FIG. 2, the wall 12 is adherized to a central rod 25 which acts as a movement or stroke limiter between the rigid wall 11 and a plate 26.

This latter defines, with the casing 10 and wall 12, an additional chamber 27 connected by two conduits 28, 29, to a bearing of the camshaft 31.

This camshaft 31 comprises a first central channel 32, supplied with pressurized oil by the oil pump of the engine (not shown), and a second central discharge channel 33.

The channel 32 terminates in two perpendicular bores 34, each end of which communicates successively, in the course of rotation of the camshaft 31, with conduit 28.

The channel 33 extends from two perpendicular bores 35, each end of which communicates successively, in the course of rotation of the camshaft 31, with conduit 29.

The relative arrangements of the conduits 28, 29 and bores 34, 35 are such that the communicating of the additional chamber 27 with the discharge channel 33 alternates with the communicating of the same chamber 27 with the pressurized channel 32.

This results in alternate movements of the wall 12 which, in turn, results in displacements of the fitting 5 with respect to fitting 6 of support 3.

As in the first embodiment, these movements are provided to be in phase with those of the engine and of the same amplitude.

Having now described our invention what we claim as new and desire to secure by Letters Patent is:

1. In a suspension device between a rotating engine contained in a housing and its support structure, a compensating device adapted to eliminate the transmission from the engine to the support structure of parasitic vibrations generated by the lack of balance of the rotating members in the rotating engine, said compensating device comprising:
    (a) an elastic support secured to the housing of the rotating engine on one end and to the support structure on the other end,
    (b) a first variable volume chamber housed in said elastic support, the volume of said chamber being variable due to the deformation of the elastic support,
    (c) a second variable volume chamber secured to the housing of the rotating engine,
    (d) a flexible wall closing said second chamber,
    (e) transmission means between said flexible wall and the rotating members of the rotating engine and adapted to cause said flexible wall to be subjected to alternate displacements, the frequency and phase of which corresponding to the parasitic vibrations of the rotating engine due to its lack of balance,
    (f) conduit means connecting said first chamber and said second chamber,
    (g) fluid means filling said first and second chambers and said conduit means, said fluid means permitting the transmission of the impulses generated in the second chamber by the displacements of the flexible wall from said second chamber to said first chamber, thus causing the elastic support to be deformed as a function of the parasitic vibrations of the rotating engine.

2. The device of claim 1, wherein the second chamber is constituted by a casing closed at one end by a rigid transverse wall and at the other end by said flexible wall made of elastic material, whose periphery is integral with the casing.

3. The device of claim 1, wherein said rotating engine is an internal combustion engine and the transmission means are constituted by a driving device connected to the crankshaft of said engine.

4. The device of claim 3, wherein said driving device is constituted by a push rod secured to the centre of said flexible wall, said push rod abutting on a cam rotated by the crankshaft of the engine and adapted to transmit to said push rod two displacements per revolution of the crankshaft.

5. The device of claim 4, wherein said cam has four lobes and is integral with the camshaft of the engine.

6. The device of claim 3, wherein the transmission means for displacing the flexible wall comprises an additional chamber with a deformable wall which is defined by the face of said flexible wall opposite the second chamber, said additional chamber being supplied with fluid by a fluid impulse generator synchronised with the crankshaft of the engine.

7. The device of claim 6, wherein said fluid impulse generator is constituted by a bearing of the camshaft of the engine, said camshaft comprising a first central channel supplied with pressurised oil by the oil pump of the engine and a second central discharge channel, said first and second channels terminating in two perpendicular bores, each end of which communicates successively, in the course of rotation of the camshaft, respectively, with a first and a second conduits for connection with the additional chamber.

8. The device of claim 6, wherein said flexible wall is adherized to a central rod for limiting stroke between the rigid transverse wall at one end and a rigid plate forming a transverse wall for the additional chamber opposite the elastic wall at the other end.

9. The device of claim 7, wherein said first and second conduits open in said plate.

10. The device of claim 1, further comprising a device for limiting the variations in pressure of the fluid under the effect of movements of the support structure.

11. The device of claim 10, wherein said limiting device comprises a damping chamber defined by said rigid transverse wall of the second chamber and a second flexible wall, said damping chamber communicating with said second chamber by an aperture in said rigid wall, said aperture being calibrated in order to allow passage of fluid impulses of low frequencies, resulting from the movements of the support structure caused by the road and transmitted through said elastic support, and to block the impulses whose frequency is greater than a predetermined value.

* * * * *